(12) United States Patent
Jang (10) Patent No.: US 7,869,489 B2
(45) Date of Patent: Jan. 11, 2011

(54) APPARATUS AND METHOD FOR ACQUIRYING A PREAMBLE IN AN ORTHOGONAL FREQUENCY DIVISION MULTIPLE ACCESS MOBILE TERMINAL

(75) Inventor: Woo Jin Jang, Seoul (KR)

(73) Assignee: Pantech Co., Ltd., Seoul (KR)

(*) Notice: Subject to any disclaimer, the term of this patent is extended or adjusted under 35 U.S.C. 154(b) by 956 days.

(21) Appl. No.: 11/694,243

(22) Filed: Mar. 30, 2007

(65) Prior Publication Data

US 2007/0253472 A1 Nov. 1, 2007

(30) Foreign Application Priority Data

Apr. 27, 2006 (KR) .................. 10-2006-0037986

(51) Int. Cl.
*H04B 1/00* (2006.01)
(52) U.S. Cl. ........................... 375/150; 375/149
(58) Field of Classification Search .............. 375/140, 375/260, 354, 362, 365, E1.008, E1.011, 375/142, 145, 147, 149–150, 340, 343; 370/59, 370/69.1, 281, 295, 302, 343, 478, 480, 481, 370/203–210, 335–342, 57, 470; 340/21; 455/434, 69, 336, 522
See application file for complete search history.

(56) References Cited

U.S. PATENT DOCUMENTS

| 6,650,689 B1* | 11/2003 | Oishi et al. ............... 375/142 |
| 6,873,664 B1* | 3/2005 | Clark ....................... 375/340 |
| 7,072,318 B2* | 7/2006 | Shoji et al. ................ 370/335 |
| 7,085,246 B1* | 8/2006 | LaRosa et al. ............. 370/311 |
| 7,257,149 B2* | 8/2007 | Jin .......................... 375/147 |
| 7,292,619 B2* | 11/2007 | Molisch et al. ............ 375/137 |
| 7,321,584 B2* | 1/2008 | Lee et al. ................. 370/350 |
| 2004/0047401 A1* | 3/2004 | Keller et al. .............. 375/147 |
| 2006/0078040 A1* | 4/2006 | Sung et al. ................ 375/140 |
| 2006/0098752 A1* | 5/2006 | Song et al. ................ 375/260 |
| 2006/0126491 A1* | 6/2006 | Ro et al. .................. 370/208 |

(Continued)

OTHER PUBLICATIONS

Ho et al., Rapid Acquisition For Multiband UWB Systems: CAZAC vs. Barker Sequences, Dec. 15-18, 2003, Information, Communications and Signal Processing, 2003 and the Fourth Pacific Rim Conference on Multimedia, Proceedings of the 2003 Joint Conference of the Fourth International Conference on, vol. 3, pp. 1727-1731.*

*Primary Examiner*—Tesfaldet Bocure
*Assistant Examiner*—Lawrence B Williams
(74) *Attorney, Agent, or Firm*—H.C. Park & Associates, PLC (57) ABSTRACT

A preamble acquisition apparatus includes a first PN code generation unit for generating a first PN code having a bit string, a first correlation calculation unit for correlating a received frequency domain preamble signal with the first PN code within a first correlation range to generate a first correlation value, a first correlation value comparison unit for comparing the first correlation value with a first threshold value, a second PN code generation unit for generating a second PN code, a second correlation calculation unit for correlating the received frequency domain preamble signal with the second PN code within a second correlation range to generate a second correlation value, and a preamble acquisition determination unit for comparing the second correlation value with a second threshold value to determine whether to acquire the preamble. The bit values of the first PN code are located in the second PN code.

16 Claims, 7 Drawing Sheets

U.S. PATENT DOCUMENTS

2006/0133321 A1* 6/2006 Lim et al. .................. 370/331
2007/0230590 A1* 10/2007 Choi et al. ................. 375/260
2008/0043858 A1* 2/2008 Lim et al. .................. 375/260

* cited by examiner

| FIRST PN CODE HEXADECIMAL | INDEX OF SECOND PN CODE |
|---|---|
| '0' | 37, 42, 52, 54, 89, 101, 86 |
| '1' | 22, 34, 80, 82, 91 |
| '2' | 40, 43, 10 |
| ⋮ | ⋮ |

FIG. 6

| FIRST PN CODE HEXADECIMAL | INDEX OF PN CODE | PN CODE HEXADECIMAL |
|---|---|---|
| '0' | 37 | "09961E7309A9B7F3929C370C51910EBAB1B4f409FA976AE8679F354C84C4051F371F902" |
| '0' | 42 | "05ADFCA2F8207DC6FF8D1A85A1DD4694D4C48A838C4F833C532710021AC448A7B62B8DD" |
| '0' | 52 | "09847B6187BB5F6F6728B4ED610088FAD9DADFC00748E9DCD8A0CE320D6C991654ABE05" |
| .... | .... | .... |

FIG. 7

FIG. 8 ic mobile communication system according to a conventional CDMA system uses a method for correlating a received preamble signal and a PN code in a terminal to identify a base station. In the case of the CDMA system, the length of the PN code that is used to identify the base station is $2^{15}$ bits. According to this method, correlating the preamble

APPARATUS AND METHOD FOR ACQUIRYING A PREAMBLE IN AN ORTHOGONAL FREQUENCY DIVISION MULTIPLE ACCESS MOBILE TERMINAL

CROSS REFERENCE TO RELATED APPLICATION

This application claims priority from and the benefit of Korean Patent Application No. 10-2006-0037986, filed on Apr. 27, 2006, which is hereby incorporated by reference for all purposes as if fully set forth herein.

BACKGROUND OF THE INVENTION

1. Field of the Invention

The present invention relates to an apparatus and method for acquiring a preamble in an orthogonal frequency division multiple access (OFDMA) mobile terminal, and more particularly, to an apparatus and method for acquiring a preamble by correlating a received preamble symbol with two types of pseudo-noise (PN) codes having different lengths.

2. Discussion of the Background

The portable Internet, wireless broadband (WiBro), which is in the spotlight as a substitute for third generation (3G) wireless mobile communication technology based on Wideband Code Division Multiple Access (WCDMA), CDMA 2000, and the like, may offer solutions to problems of the third generation mobile communication technology, such as the limit of transmission speed.

The portable Internet, referred to as a 3.5 generation (3.5G) mobile communication technology, has advantages of mobility, which is provided in the third generation wireless mobile communication, and a high data transmission speed of broadband Internet.

The portable Internet adopts an orthogonal frequency division multiple access (OFDMA) system using a transmission band of about 100 MHz from a frequency band between 2.3 GHz and 2.4 GHz, and even when a user is traveling at a speed of about 60 km/hour, the portable Internet may support stable data transmission of more than 1 Mbps, which is different from the conventional third generation mobile communication technology. Accordingly, the portable Internet may be capable of simultaneously providing various types of services, and of transmitting multimedia data in real time.

OFDMA, which is a multi-access method adopted by the portable Internet, designates a system where a single channel carrier band is divided into many sub-channel carriers, which are also referred to as subcarriers, and users are allocated to a different group of valid subcarriers.

A connection between a mobile base station and a mobile terminal according to the OFDMA system includes an upstream channel corresponding to data transmission from the mobile terminal to the mobile base station, and a downstream channel corresponding to data transmission from the mobile base station to the mobile terminal. An upstream channel and a downstream channel transmit data by a frame unit, which includes a plurality of symbols. Here, a first symbol of each frame corresponds to a preamble, and the preamble is used for searching a cell and for performing base station identification and initial synchronization of a portable Internet terminal. Specifically, a cell searching process for searching for a cell of the portable Internet terminal and identifying a target base station with which to establish a wireless connection may frequently occur when supplying power to the portable Internet terminal or when performing a hand-off due to a portable Internet terminal's movement between cells. Also, the cell searching process should be performed quickly to ensure and maintain quality of service.

According to the Institute of Electrical and Electronics Engineers (IEEE) 802.16d/e standard, each frequency band includes 1,024 subcarriers. Of these 1,024 subcarriers, 172 subcarriers are guard band subcarriers, and 852 subcarriers are utilized for data transmission. Each base station is allocated with a plurality of subcarriers for each designated segment, and transmits a plurality of data symbols using the allocated subcarriers. Also, according to the IEEE 802.16d/e standard, each of 284 subcarriers in a group of 852 subcarriers, which are included in each of the frequency bands, are allocated among 3 segments. Accordingly, a single OFDMA symbol includes a bit string which is transmitted via 284 subcarriers.

Figure 1:
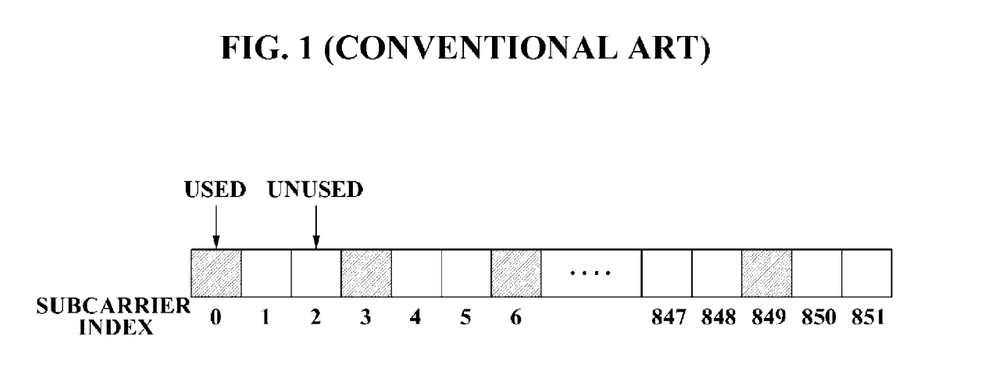
FIG. 1 is a diagram illustrating a conventional OFDMA preamble transmission structure in a frequency domain.

FIG. 1 is a diagram illustrating a preamble transmission structure for each segment in a frequency domain. As shown in FIG. 1, the preamble, a type of the OFDMA symbol, is transmitted via 284 subcarriers, which are regularly arranged at intervals of 3 subcarriers. In FIG. 1, only a segment number of '0' is described.

A preamble signal, which is transmitted from the base station, includes a unique bit string allocated to each base station. The mobile terminal receives the transmitted preamble signal, and compares the received preamble signal with a PN code generated in the mobile terminal, and thereby identifies the unique bit string contained in the preamble signal.

When comparing the preamble signal with the PN code, a correlation in the frequency domain is generally used. Specifically, a frequency domain preamble signal is correlated with a plurality of PN codes, and when a correlation value is greater than a predetermined threshold value, a bit string of a corresponding PN code is determined to be equal to the bit string of the received preamble signal. The above-described process is referred to as a preamble acquisition process.

Figure 2:
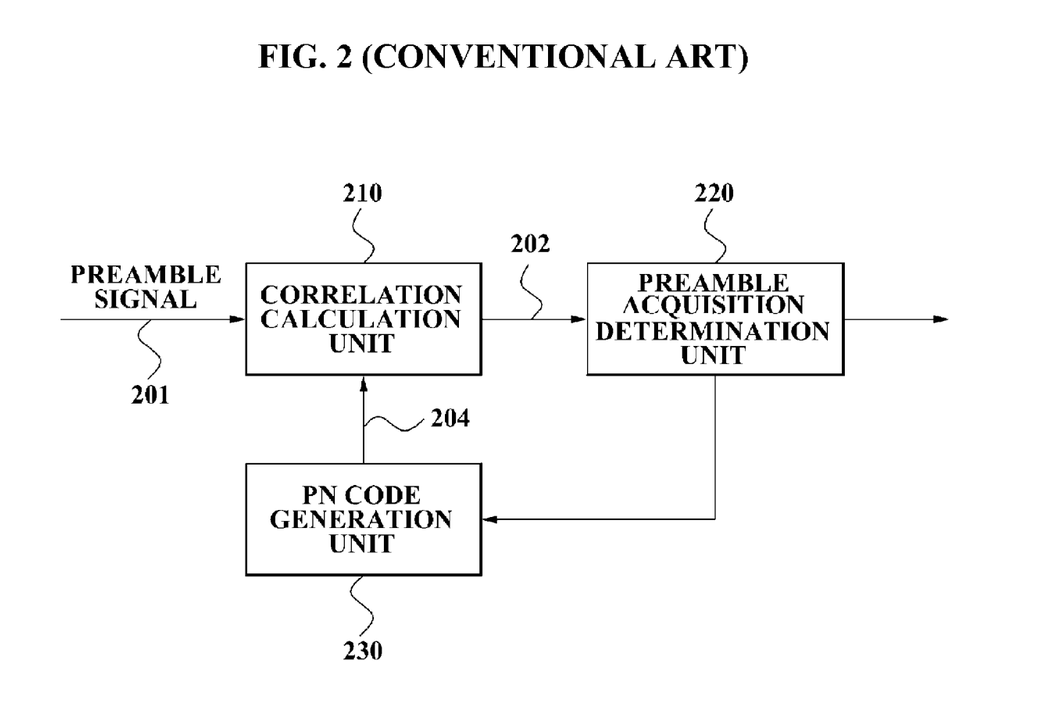
FIG. 2 is a block diagram illustrating a preamble acquisition apparatus according to a conventional art.

FIG. 2 is a block diagram illustrating a conventional preamble acquisition apparatus according to the conventional art. Referring to FIG. 2, a correlation calculation unit 210 receives a preamble signal 201, and correlates the received preamble signal 201 and a candidate PN code 204. Here, the candidate PN code 204 is generated by a PN code generation unit 230. Also, a preamble acquisition determination unit 220 compares a correlation value 202 with a predetermined threshold value, and determines whether to acquire the preamble. When the correlation value 202 is greater than the threshold value, the PN code 204 is acquired and outputted as an acquired preamble. When the correlation value 202 is less than the predetermined threshold value, another PN code is generated by the PN code generation unit 230, and this correlation process is repeated.

Even a mobile communication system according to a conventional CDMA system uses a method for correlating a received preamble signal and a PN code in a terminal to identify a base station. In the case of the CDMA system, the length of the PN code that is used to identify the base station is $2^{15}$ bits. According to this method, correlating the preamble signal and the candidate PN codes generated by the terminal requires a large number of calculations and a significant amount of time. This method also consumes scarce terminal resources to acquire the preamble. Accordingly, the entire system performance may deteriorate. Also, when the preamble is acquired by performing a large number of calculations each time the initial synchronization and the cell searching process are performed, power from a battery power source, which has only a limited power supply, may be consumed unnecessarily.

However, a systematic correlation method may reduce a preamble acquisition time. In a systematic correlation method, a preamble signal is initially correlated with a portion of a candidate PN code. If a correlation value is greater than a predetermined threshold value such that the preamble signal and the candidate PN code are determined to be sufficiently similar to each other, the preamble signal is further correlated with the remainder of the candidate PN code.

Figure 3:
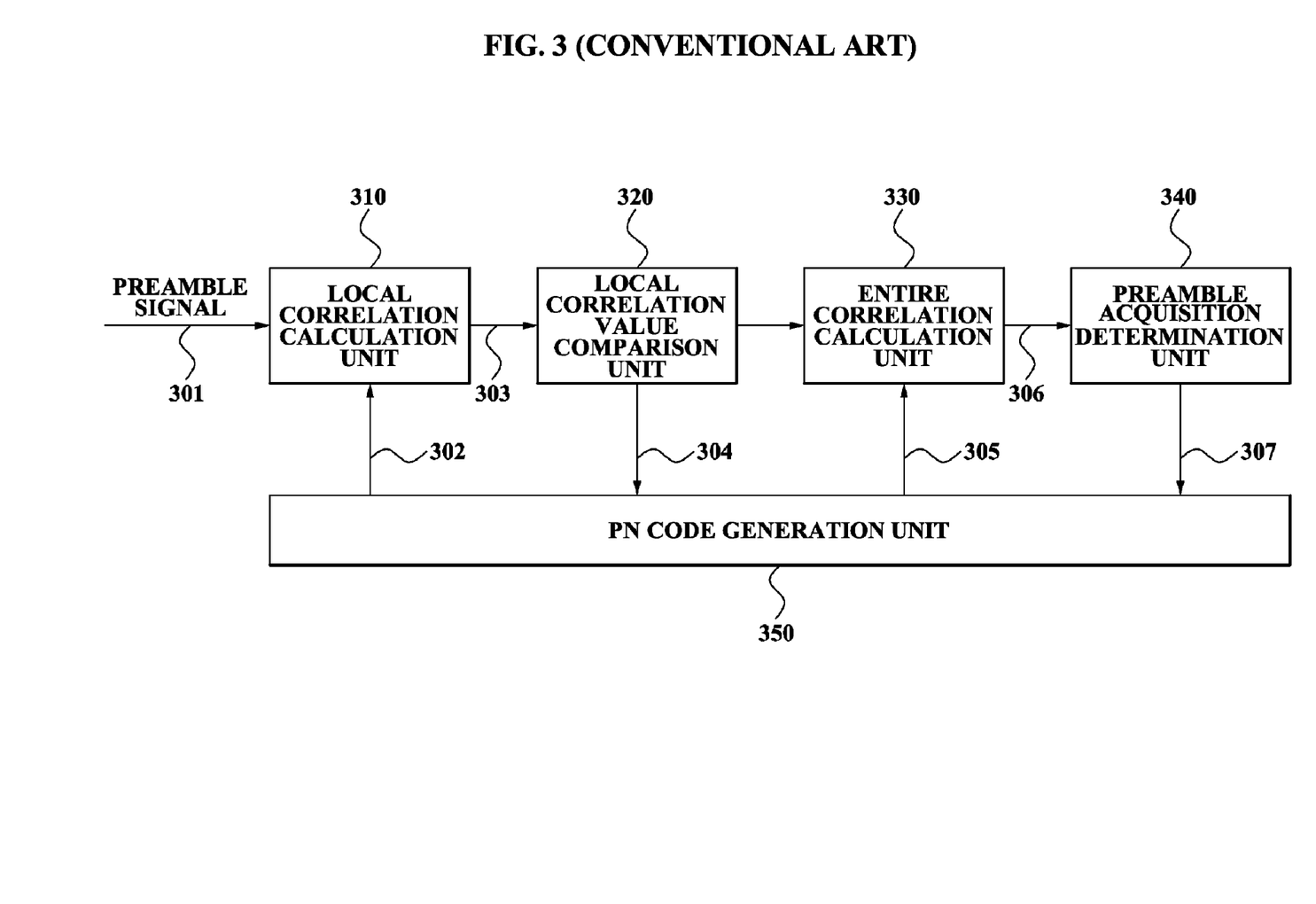
FIG. 3 is a block diagram illustrating a preamble acquisition apparatus using a double dwell algorithm according to the conventional art.

This systematic correlation method is referred to as a double dwell algorithm, and is applied to a preamble acquisition apparatus included in a CDMA mobile terminal. FIG. 3 is a block diagram illustrating the preamble acquisition apparatus using the double dwell algorithm.

Referring to FIG. 3, a local correlation calculation unit 310 correlates a received preamble signal 301 with a local PN code 302 corresponding to a portion of an entire PN code 305 generated by a PN code generation unit 350. When a correlation value 303 is greater than a predetermined threshold value, a correlation calculation is performed with respect to the received preamble signal 301 and the length of the entire PN code 305 via an entire correlation calculation unit 330. When the correlation value 303 acquired from the local correlation calculation unit 310 is less than the threshold value, a control signal 304 is transmitted to the PN code generation unit 350 to generate another PN code. Another local PN code 302 corresponding to a portion of the additionally generated PN code is then used for a local correlation with the preamble signal 301 in the local correlation calculation unit 310.

Also, when a correlation value 306 acquired from the entire correlation calculation unit 330 is less than a predetermined threshold value, a preamble acquisition determination unit 340 transmits a control signal 307 to the PN code generation unit 350 to generate an additional entire PN code 305 based upon the local PN code 302 having a correlation value 303 that is greater than a predetermined threshold value. The additionally generated entire PN code 305 is correlated in the entire correlation calculation unit 330, and acquired if the preamble acquisition determination unit 340 determines to acquire the preamble based on the correlation value 306.

According to the double dwell algorithm, a preamble acquisition time may be significantly reduced by eliminating an unnecessary correlation time. However, when using the double dwell algorithm, the calculation time may be reduced via a systematic correlation calculation, but an operation of generating a PN code is not systematically performed. Accordingly, the entire PN code 305 is generated for each calculation even when the local PN code 302, which is a portion of an entire PN code 305, results in a correlation value 303 that is less that the threshold value.

Also, a preamble acquisition apparatus using the conventional double dwell algorithm must repeat a local correlation calculation at the local correlation calculation unit 310 even when a local PN code 302, which is used for the local correlation calculation, is identical to a previously used local PN code 302.

Ineffectiveness of the double dwell algorithm, as described above, is attributed to the property of a CDMA PN code. Specifically, the length of the CDMA PN code is $2^{15}$ bits, which is relatively long. Also, the CDMA PN code is not clearly defined in a standard of possible PN codes. Accordingly, performance of the double dwell algorithm may be improved by improving a method of generating entire PN codes 305, and systematically correlating a preamble signal with a portion of the entire PN codes 305.

However, in the case of the OFDMA PN code, the length of the OFDMA PN code is 284 bits, which is comparatively very short. Also, the types of possible PN codes are limited to 114.

Accordingly, when appropriately using this feature of OFDMA PN codes, the problems which occur in the double dwell algorithm may be solved. Specifically, using properties of PN codes contained in OFDMA that differ from CDMA PN code properties may permit the improvement of performance over performance when using the conventional double dwell algorithm.

Accordingly, a new technology has been developed to improve preamble acquisition speed by applying a systematic correlation calculation method to an OFDMA mobile terminal, and to prevent unnecessary power consumption by leveraging the properties of OFDMA PN codes.

SUMMARY OF THE INVENTION

This invention provides an apparatus and method for acquiring a preamble in an OFDMA mobile terminal by correlating a received preamble symbol with two types of pseudo-noise (PN) codes having different lengths to thereby reduce a preamble acquisition time.

Additional features of the invention will be set forth in the description which follows, and in part will be apparent from the description, or may be learned by practice of the invention.

The present invention discloses an apparatus for acquiring a preamble in an orthogonal frequency division multiple access (OFDMA) mobile terminal. The apparatus includes a first PN code generation unit to generate a first PN code comprising a bit string including at least one bit, a first correlation calculation unit to correlate a preamble signal with the first PN code within a first correlation range to generate a first correlation value, a first correlation value comparison unit to compare the first correlation value with a first threshold value and to determine whether to generate a second PN code, a second PN code generation unit to generate a second PN code comprising bit values of the first PN code, a second correlation calculation unit to correlate the preamble signal with the second PN code within a second correlation range to generate a second correlation value, and a preamble acquisition determination unit to compare the second correlation value with a second threshold value.

The present invention also discloses an orthogonal frequency division multiple access (OFDMA) mobile terminal apparatus including a frequency domain transform unit to transform a time domain preamble signal into a frequency domain preamble signal, a preamble acquisition unit to acquire a preamble by correlating the frequency domain preamble signal with a PN code, and a cell search unit to extract base station information of a cell where the terminal apparatus is located from the acquired preamble. The preamble acquisition unit correlates the frequency domain preamble signal with a first PN code within a first correlation range, and correlates the frequency domain preamble signal with a second PN code comprising bit values of the first PN code within a second correlation range to determine whether to acquire the preamble.

The present invention also discloses a method for acquiring a preamble in an orthogonal frequency division multiple access (OFDMA) mobile terminal. The method includes correlating a frequency domain preamble signal with a first PN code within a first correlation range to generate a first correlation value, comparing the first correlation value with a first threshold value, and determining whether to generate a second PN code; generating a second PN code comprising bit values of the first PN code, correlating the frequency domain preamble signal with the second PN code within a second correlation range to generate a second correlation value, and comparing the second correlation value with a second threshold value, and acquiring the second PN code as the preamble.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 4:
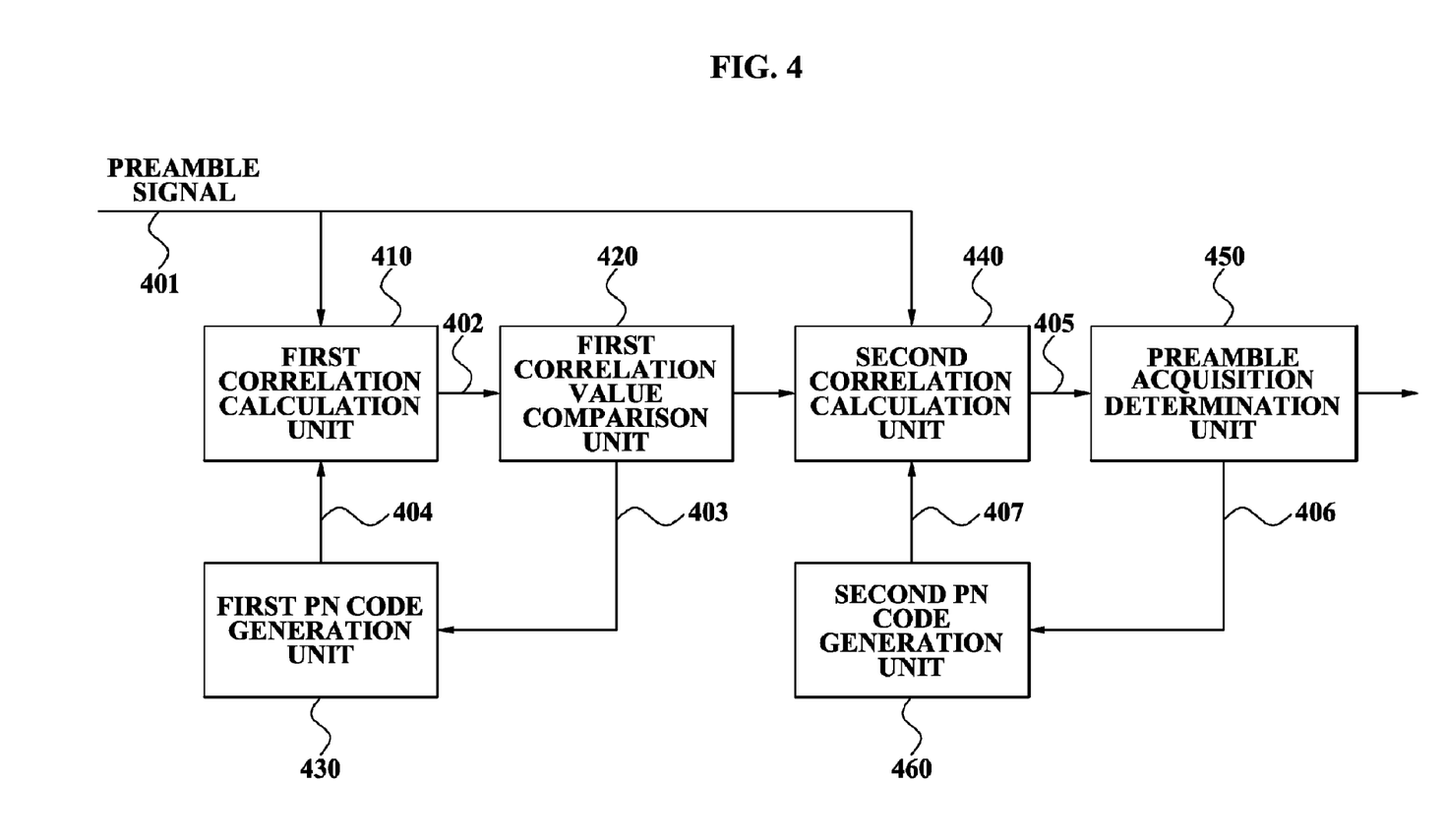
FIG. 4 is a block diagram illustrating a preamble acquisition apparatus according to an exemplary embodiment of the present invention.

FIG. 4 is a block diagram illustrating a preamble acquisition apparatus according to an exemplary embodiment of the present invention. Referring to FIG. 4, a first correlation calculation unit 410 correlates a received preamble signal 401 in the frequency domain with a first PN code 404 within a first correlation range, and generates a first correlation value 402. The first PN code 404 is generated by a first PN code generation unit 430. The first correlation value 402 is inputted into a first correlation value comparison unit 420, and compared with a first threshold value. Whether the received preamble signal 401 is correlated with a second PN code 407 depends upon the result of this comparison.

Specifically, according to an exemplary embodiment of the present invention, if the first correlation value 402 is greater than the first threshold value, the received preamble signal 401 is correlated with the second PN code 407, which is generated by a second PN code generation unit 460, within a predetermined second correlation range. To the contrary, if the first correlation value 402 is less than the first threshold value, the first correlation value comparison unit 420 transmits a first control signal 403 to the first PN code generation unit 430 to generate an additional first PN code 404.

If the first correlation value comparison unit 420 determines that the received preamble signal 401 should be correlated with the second PN code 407 in a second correlation calculation unit 440, the second PN code generation unit 460 generates the second PN code 407 where a code identical to the first PN code 404 is located in specific bits of the second PN code 407. Also, the second correlation calculation unit 440 correlates the preamble signal 401 with the generated second PN code 407 within the second correlation range.

A second correlation value 405, which is acquired in the second correlation calculation unit 440, is inputted into a preamble acquisition determination unit 450. The preamble acquisition determination unit 450 compares the second correlation value 405 with a second threshold value, and determines whether to acquire the preamble.

Specifically, according to an exemplary embodiment of the present invention, if the second correlation value 405 is greater than the second threshold value, the second PN code 407, which is used for calculating the second correlation value 405, is acquired as the preamble. To the contrary, if the second correlation value 405 is less than the second threshold value, the preamble acquisition determination unit 450 transmits a second control signal 406 to the second PN code generation unit 460, to generate an additional second PN code 407.

As described above, the preamble acquisition apparatus according to the present invention may significantly reduce an unnecessary correlation calculation by separating a process of correlating a preamble signal with candidate PN codes into at least two operations, and by using a pre-processing procedure. In the pre-processing procedure, a first PN code 404 with a low preamble acquisition probability is filtered via a first correlation calculation unit 410, before a second correlation calculation unit 440 performs a more accurate correlation calculation. Also, according to the present invention, power consumption by a mobile terminal may be reduced and quick cell searching may be supported during a hand-off.

The operation of each configuration element shown in FIG. 4 will be described in further detail below.

As described above, the first correlation calculation unit 410 correlates the received preamble signal 401 with the first PN code 404 within the first correlation range, and generates the first correlation value 402. The length of the first PN code 404 may be shorter than the entire received preamble signal 401. In this case, the length of the first correlation range where the entire received preamble signal 401 and the first PN code 404 are correlated may be identical to the length of the first PN code 404.

Also, the first correlation range may have the same length as the first PN code 404 where a specific bit of the preamble signal 401 is a starting location. Also, the second correlation range for the second correlation calculation unit 440 to correlate the preamble signal 401 with the second PN code 407 may have the same length as the second PN code 407, which is generated by the second PN code generation unit 460.

According to an exemplary embodiment of the present invention, the length of the first correlation range may be shorter than the length of the second correlation range. For example, the length of the first correlation range may be 4 bits. Also, the length of the second correlation range may be determined to have a value less than a number of subcarriers, and more specifically, less than the length of a received preamble signal 401.

In an OFDMA mobile communication system, a single preamble signal includes a unique bit string of 284 bits. The preamble signal may include a single bit string among different bit strings for a total of 114 bits. Since each single subcarrier is allocated to each bit, the single preamble signal is transmitted via 284 subcarriers. Accordingly, the length of the second PN code and the second correlation range may not exceed 284 bits. Also, according to the above-described exemplary embodiment, the length of the first correlation range may be shorter than 284 bits.

Hereinafter, this exemplary embodiment will be described where the length of the first correlation range is four bits and the length of the second correlation range is 284 bits. Also, although the first correlation range may start from a specific location of the preamble signal, this exemplary embodiment will be described where the first correlation range corresponds to the first four bits of the preamble signal. It will be apparent to those of ordinary skill in the related art that the present invention is not limited thereto.

Referring again to FIG. 4, the first PN code 404 is generated by the first PN code generation unit 430, and may have a length of four bits. In this circumstance, a total of 16 (=$2^4$) unique codes may exist. These may be referred to as possible first PN codes, and may depend upon the number of bits of the first PN code. Each first PN code 404 may be indicated by a hexadecimal.

Accordingly, the first correlation calculation unit 410 performs a total of 16 correlation calculations with respect to the received preamble signal 401 within the 4-bit correlation range. If the first PN code 404 has a greater correlation value than the first threshold value among the first correlation values 402 according to the comparison result of the first correlation value comparison unit 420. The first PN code 404 also has a comparatively similar value to the first four bits of the preamble signal 401. Accordingly, the first PN code 404 may also be used for a correlation calculation with the second PN code 407 having, for example, 284 bits, which is equal to the number of subcarriers of the preamble signal 401 and greater than the first PN code 404. Conversely, when the first correlation value 402 is less than the first threshold value, the second PN code 407 corresponding to the first PN code 404 is not generated for the correlation calculation in the second correlation calculation unit 440.

Specifically, the second PN code 407 may be determined so that a bit string of a pattern identical or similar to the first PN code 404 is located in specific bits of the second PN code 407. Accordingly, the single second PN code 407 corresponds to the single first PN code 404. Also, the single first PN code 404 may correspond to at least one second PN code 407.

Accordingly, when the first correlation value comparison unit 420 determines that the received preamble signal 401 should be correlated with the second PN code 407, the second PN code generation unit 460 may generate the second PN code 407 with the length of 284 bits by referring to a corresponding relation between the first PN code 404 and the second PN code 407 as described above.

For example, the first correlation value 402 is acquired by correlating the first four bits of the received preamble signal 401 and the first PN code 404 having a binary "0000" value, i.e. a hexadecimal '0' value, and when the first correlation value 402 is greater than the first threshold value, the second PN code generation unit 460 generates only second PN codes 407 that start with the hexadecimal '0' value, from a total of 114 possible second PN codes 407 having a length of 284 bits. The second PN code generation unit 460 then inputs the generated second PN codes 407 into the second correlation calculation unit 440.

Hereinafter, an operation of the second PN code generation unit 460 generating a second PN code 407 from the first PN code 404 will be described in detail.

According to an exemplary embodiment of the present invention, the second PN code generation unit 460 may include an index table storage unit and a code generator. The index table storage unit stores an index of a second PN code 407 corresponding to a first PN code 404. The code generator generates the second PN code 407 based on an index value of the second PN code 407.

Figure 5:
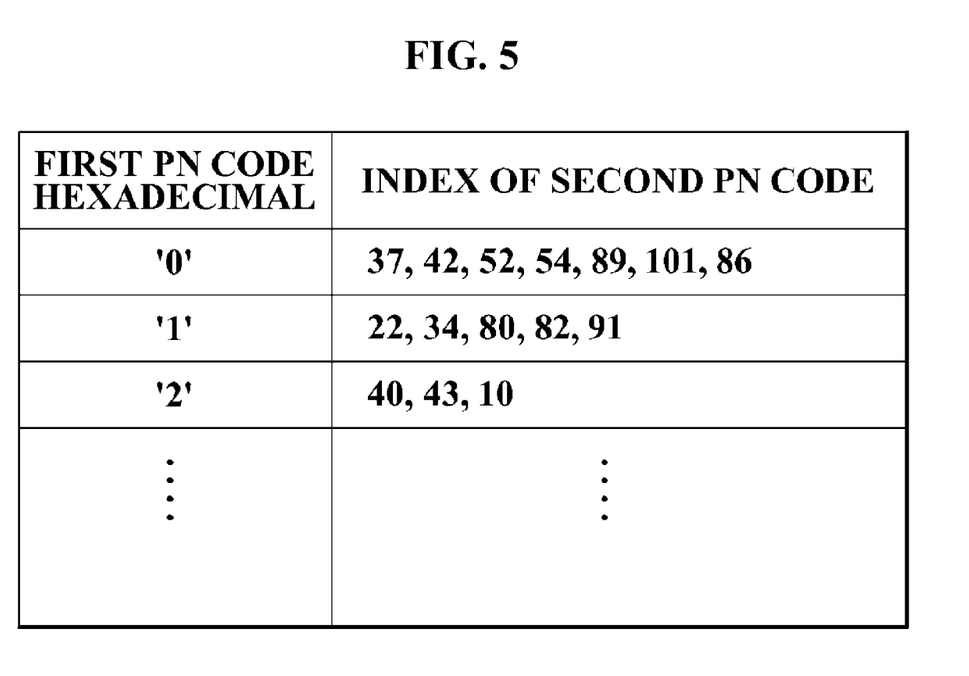
FIG. 5 illustrates an index table included in an index table storage unit of a preamble acquisition apparatus according to an exemplary embodiment of the present invention.

FIG. 5 illustrates an example of an index table according to the above-described exemplary embodiment. Referring to FIG. 5, an index of the second PN code 407 corresponding to each of 16 first PN codes is stored in a form of a table. Specifically, indexes of second PN codes 407 which start with the hexadecimal '0' may be 37, 42, 52, 54, 89, 86, and 101.

Accordingly, the code generator may generate the second PN code 407 based on the index value of the second PN code 407 that is stored in the index table storage unit.

For example, the code generator may be a PN code generator that includes a series of shift registers, and may generate the second PN code 407, which consists of a total of 284 bit strings, by using the index of the second PN code 407 as a seed or an initial input pattern.

As described above, in the case of a PN code which is used for identifying an OFDMA preamble, a limited number of code patterns may be defined according to a standard. Accordingly, it is possible to pre-store the corresponding relation in the form of the table and refer to the table when performing the correlation calculation. However, the length of a CDMA PN code using a double dwell algorithm is relatively very long and a code pattern thereof is not pre-defined. Accordingly, the CDMA PN code may not configure the preamble acquisition apparatus as described in the present exemplary embodiment. Thus, according to the present exemplary embodiment where the property of an OFDMA PN code is sufficiently used, it is possible to effectively prevent a repeated local correlation calculation that occurs in the conventional double dwell algorithm.

Also, according to another exemplary embodiment of the present invention, the second PN code generation unit 460 may include a code table storage unit and a code generator. The code table storage unit may store a PN code corresponding to the first PN code 404. The code generator may generate the second PN code 407 by selecting the stored PN code with reference to the code table storage unit.

Figure 6:
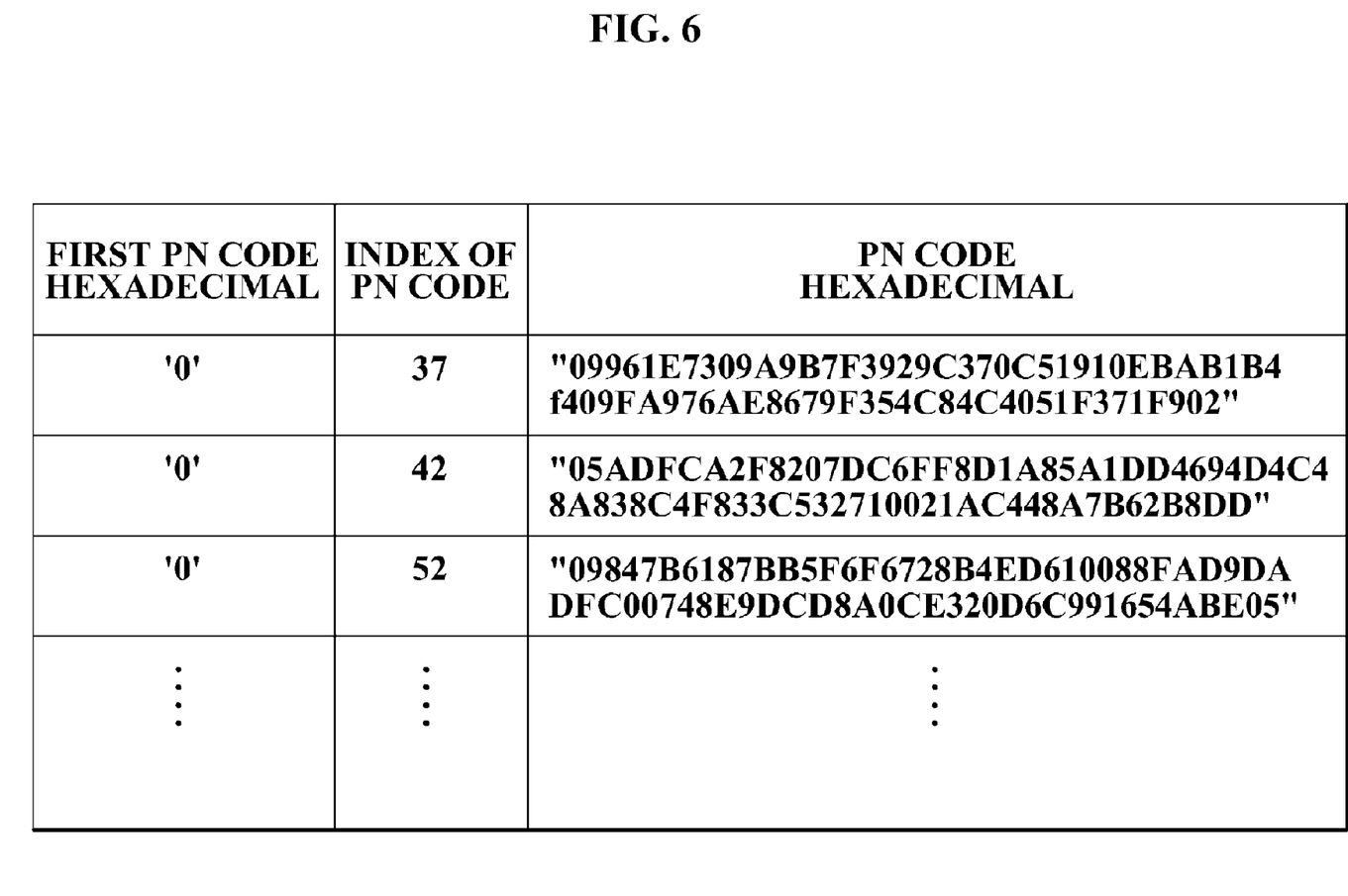
FIG. 6 illustrates a code table included in a code table storage unit of a preamble acquisition apparatus according to an exemplary embodiment of the present invention.

FIG. 6 illustrates an example of a code table according to the above-described exemplary embodiment. Referring to FIG. 6, a PN code corresponding to each first PN code 404 is stored in a form of a table. The length of the stored PN code may be, for example, 284 bits, which is identical to the length of the entire preamble signal.

Accordingly, the code generator may generate the second PN code 407 by selecting and outputting a PN code corresponding to the first PN code 404 with reference to the code table storage unit as shown in FIG. 6.

Here, PN code indexes as shown in FIG. 6 are only an example for convenience of description, and are not necessarily required to implement the present invention, and the present invention is also not limited thereto.

The present exemplary embodiment may include an additional memory storage space for storing PN codes, which is different from the above-described exemplary embodiments. However, unlike the CDMA PN code, the length of the OFDMA PN code is limited to 284 bits, and the number of the OFDMA PN codes is limited to 114. Accordingly, PN codes may be stored in the memory space of about 30 kilobits, which can be easily configured.

Also, when sharing a portion of the memory space and storing PN codes in the shared memory space, a shift register and other calculation logics for generating the PN code may not be required. Also, the PN code may be generated by referring to the memory once. Accordingly, the time required to generate the PN code may be reduced.

As described above, it is possible to secure further improved performance over the double dwell algorithm, which is applied to the CDMA PN code, by simplifying the process of generating the second PN code.

Like the second PN code generation unit 460, the first PN code generation unit 430 may pre-store a total of 16 first PN codes 404, and may use the same for the correlation calculation within the first correlation range. Specifically, the first PN code generation unit 430 according to the present exemplary embodiment may include a code table storage unit, and a code generator. The code table storage unit may generate and store PN codes, and the code generator may generate the first PN code 404 by sequentially selecting the stored PN code from the code table storage unit.

Since the first PN code 404 may be one of 16 bit strings with the length of 4 bits, the first PN code 404 may be stored more easily than the second PN code 407. The configuration of the first PN code generation unit 430 described above may improve performance by having a substantially similar configuration as the second PN code generation unit 460 according to the above-described exemplary embodiment.

Hereinafter, the first correlation value comparison unit 420 and the preamble acquisition determination unit 450 will be described. While the first correlation value comparison unit 420 compares the first correlation value with the first threshold value, the preamble acquisition determination unit 450 compares the second correlation value with the second threshold value. Except for the above described case, the first correlation value comparison unit 420 and the preamble acquisition determination unit 450 may be configured by using a substantially similar method.

According to an exemplary embodiment of the present invention, the first threshold value which is used by the first correlation value comparison unit 420, or the second threshold value which is used by the preamble acquisition determination unit 450, may be determined based on at least one of a number of subcarriers transmitting the received preamble signal 401, the length of the first correlation range, the length of the second correlation range, a total number of the first PN codes 404, and a total number of the second PN codes 407.

In this instance, the preamble acquisition apparatus may be delivered with the first threshold value or the second threshold value being pre-configured. Also, the first threshold value or the second threshold value may be configured by a user, or may be configured based on a parameter value calculated during the operation of the preamble acquisition apparatus.

Specifically, the preamble acquisition apparatus according to an exemplary embodiment of the present invention may include a parameter configuration unit. The parameter configuration unit may configure a parameter value associated with at least one of the first threshold value, the second threshold value, the length of the first correlation range, and the length of the second correlation range. Also, the parameter configuration unit may perform the configuration based on a parameter value which is inputted from a user, or based on a parameter value calculated in association with a property of the wireless channel that transmits the preamble.

Also, the preamble acquisition apparatus according to the present exemplary embodiment may include a predetermined parameter calculation unit to calculate a parameter value in association with the property of a wireless channel. The parameter calculation unit may include a semiconductor circuit for calculating a parameter, or a microprocessor, a digital signal processing unit, and other calculation units, which are included in the OFDMA mobile terminal having the preamble acquisition apparatus.

Figure 7:
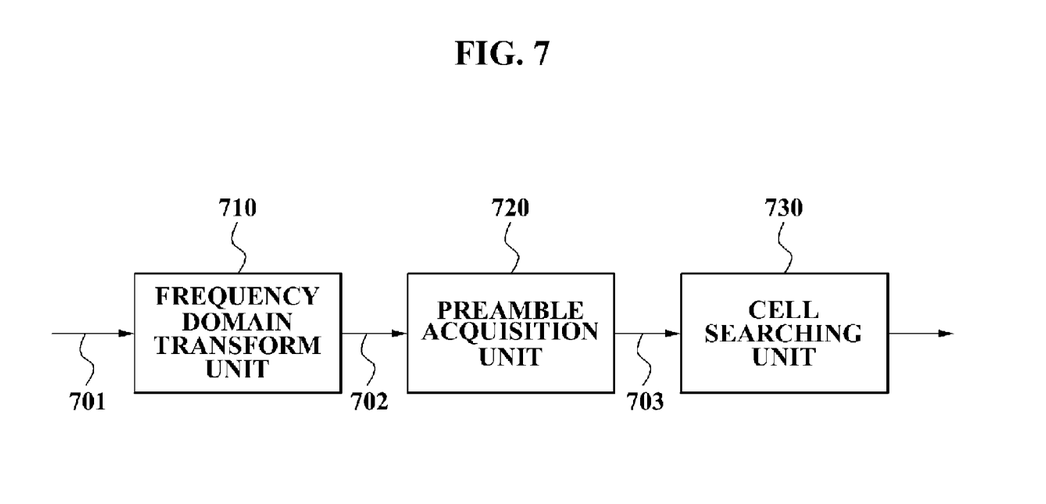
FIG. 7 is a block diagram illustrating an OFDMA mobile terminal according to an exemplary embodiment of the present invention.

FIG. 7 is a block diagram illustrating an OFDMA mobile terminal according to an exemplary embodiment of the present invention. The OFDMA mobile terminal includes a frequency domain transform unit 710, a preamble acquisition unit 720, and a cell searching unit 730.

Hereinafter, the elements of the OFDMA mobile terminal according to the present exemplary embodiment will be described in detail.

A preamble signal transmitted via a wireless channel and received at a wireless terminal may be a time domain signal 701, and may be transformed into a frequency domain signal to acquire a preamble according to the present exemplary embodiment. Accordingly, the frequency domain transform unit 710 transforms a time domain preamble signal 701 into a frequency domain preamble signal 702. For example, the frequency domain transform unit 710 may include a fast Fourier transform (FFT). Also, the frequency domain transform unit 710 may be widely applied even to other units which can transform the time domain signal 701 into the frequency domain signal 702.

Also, the preamble acquisition unit 720 systematically correlates a transformed frequency domain preamble signal 702 with a first PN code 404 and a second PN code 407, which are generated in the OFDMA mobile terminal, according to the present exemplary embodiment.

Specifically, the preamble acquisition unit 720 correlates the transformed frequency domain preamble signal 702 with the first PN code within a first correlation range, and according to the correlation result, correlates the frequency domain preamble signal 702 with the second PN code within a second correlation range, and thereby, determines whether to acquire a preamble 703. The second PN code includes a code identical or substantially similar to the first PN code in specific bits of the second PN code.

More specifically, the length of the first PN code and the first correlation range may be shorter than the length of the second PN code and the second correlation range. The first PN code may have the length of four bits. Also, the length of the second PN code may be a value no longer than the length of the entire preamble signal 702.

The preamble 703, which is acquired via the systematic correlation calculation, is inputted into the cell searching unit 730, and the cell searching unit 730 may extract base station information of a cell where the OFDMA mobile terminal is located, from the preamble 703 according to the present exemplary embodiment.

The base station of an OFDMA mobile communication system transmits the preamble 703 to each mobile terminal by using a group of subcarriers of a segment. The preamble includes a unique bit string which is assigned to the base station. Accordingly, the OFDMA mobile terminal may perform cell searching by extracting the base station information of the cell where the terminal is located using the bit string. Here, the bit string is included in the preamble 703 acquired by the preamble acquisition unit 720.

Figure 8:
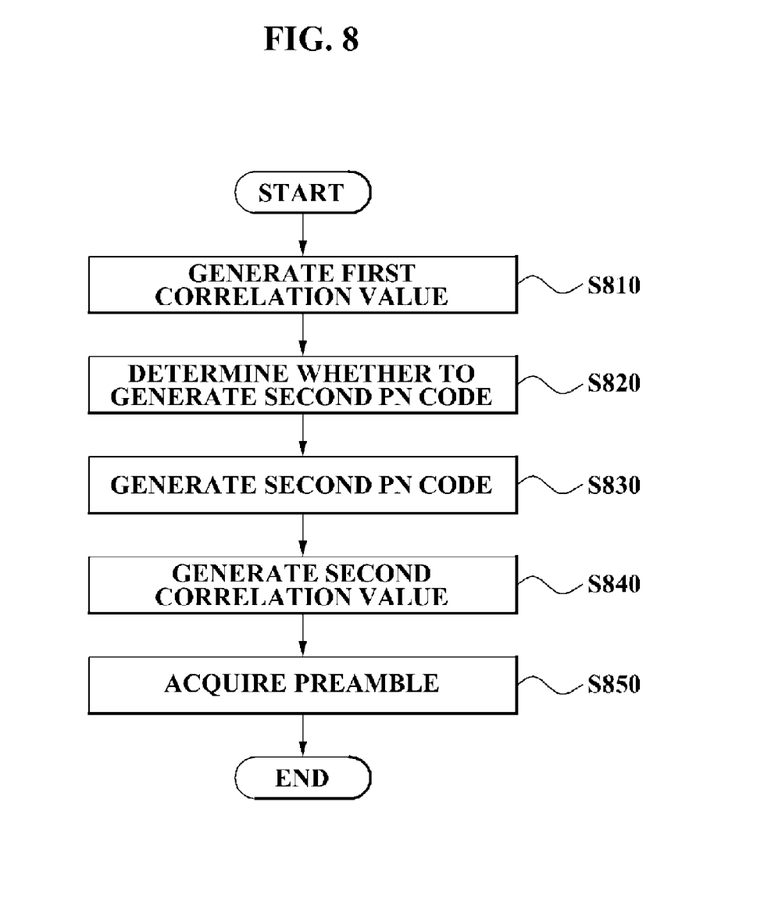
FIG. 8 is a flowchart illustrating a method for acquiring a preamble according to an exemplary embodiment of the present invention.

The present invention may be applied to a method of acquiring a preamble from a received preamble signal in an OFDMA mobile terminal. FIG. 8 is a flowchart illustrating a method of acquiring a preamble according to an exemplary embodiment of the present invention. Hereinafter, the preamble acquisition method will be described in detail with reference to FIG. 8.

In operation S810, the preamble acquisition method correlates a received frequency domain preamble signal with a first PN code within a first correlation range, and generates a first correlation value. The length of the first PN code and the first correlation range may be shorter than the length of the entire preamble signal, and may be four bits for example.

In operation S820, the preamble acquisition method compares the first correlation value with a first threshold value, and determines whether to generate a second PN code corresponding to the first PN code. The first threshold value may be determined based on at least one of a number of subcarriers transmitting the preamble, the length of the first correlation range, the length of the second correlation range, a total possible number of first PN codes, and a total possible number of second PN codes.

In operation S830, the preamble acquisition method generates the second PN code corresponding to the first PN code according to the result from operation S820. In this case, the second PN code is generated so that a code substantially similar to or identical to the first PN code is located in specific bits of the second PN code. The length of the second PN code may be longer than the length of the first PN code, and may be no longer than the length of the entire received preamble signal. In particular, the second PN code may include an equal number of bit strings as the total number of subcarriers which are used for transmitting the preamble.

In operation S840, the preamble acquisition method correlates the received frequency domain preamble signal with the second PN code within a second correlation range, and generates a second correlation value. The length of the second correlation range may be equal to the length of the second PN code.

In operation S850, the preamble acquisition method compares the second correlation value with a second threshold value, and acquires the second PN code as the preamble according to the comparison result.

Figure 9:
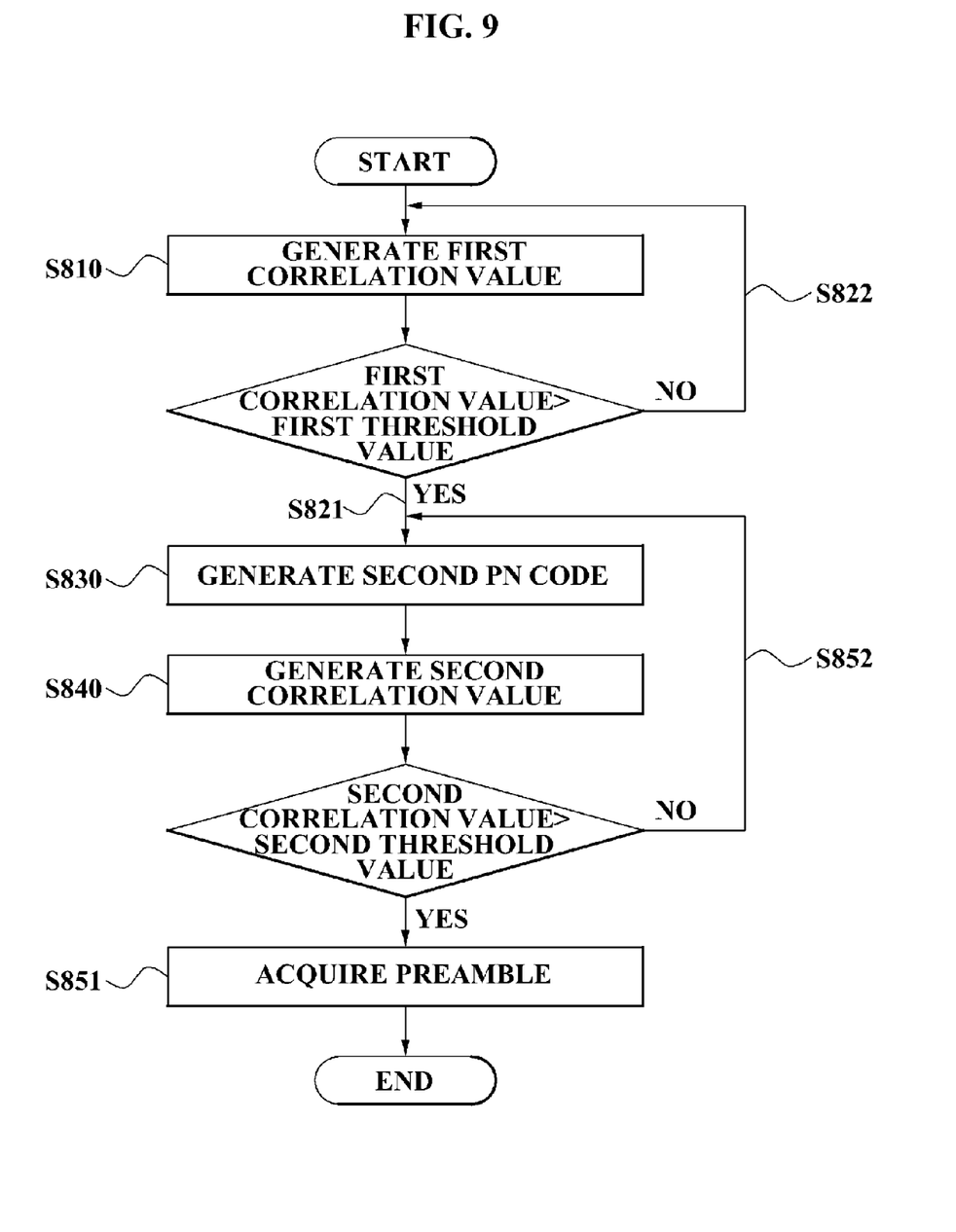
FIG. 9 is a flowchart illustrating a method for acquiring a preamble according to another exemplary embodiment of the present invention.

FIG. 9 is a flowchart illustrating a method of acquiring a preamble according to another exemplary embodiment of the present invention. Operations S810, S830, and S840 shown in FIG. 9 are substantially similar to operations S810, S830, and S840 described with respect to FIG. 8. Thus, a detailed description thereof will be omitted.

FIG. 9 illustrates operations S820 and S850 for a method of acquiring a preamble according to an exemplary embodiment of the present invention in further detail.

As shown in FIG. 9, operation S820 of comparing the first correlation value with the first threshold value and determining whether to generate a second PN code corresponding to the first PN code may include operation S821 and operation S822. In operation S821, the preamble acquisition method generates the second PN code corresponding to the first PN code when the first correlation value is greater than the first threshold value. In operation S822, the preamble acquisition method repeats operation S810 when the first correlation value is less than the first threshold value.

Also, operation S850 of acquiring the second PN code as the preamble may include operation S851 and operation S852. In operation S852, the preamble acquisition method repeats operation S830 of generating the second PN code and operation S840 of generating the second correlation value. In operation S851, the preamble acquisition method acquires the second PN code as the preamble when the second correlation value is greater than the second threshold value.

As shown in FIG. 9, when the first correlation value generated in operation S810 is less than a predetermined value, operation S840, which includes more calculations than operation S810, is not performed. Accordingly, it is possible to prevent unnecessary calculations from being performed for a PN code with a low preamble acquisition probability. Also, a preamble acquisition time in a mobile terminal may be reduced, which may significantly improve cell searching speed and performance.

Also, unlike the conventional double dwell algorithm, the preamble acquisition apparatus according to the present invention may perform a total of 16 correlation calculations with respect to the received preamble signal where the first PN code has four bits. Accordingly, a calculation burden of the first correlation calculation unit may be greatly decreased.

However, the conventional double dwell algorithm performs a local correlation calculation for local codes included in all PN codes since a group of PN codes is not clearly defined according to CDMA standards.

As described above, according to the present invention, an apparatus and method are provided that can overcome disadvantages of the double dwell algorithm as applied to the conventional CDMA PN code, and can leverage advantages of the double dwell algorithm by using properties of the OFDMA PN code, and thereby can acquire a preamble in a more suitable manner for OFDMA.

The method for acquiring a preamble and a mobile terminal with a preamble acquisition function according to another exemplary embodiment of the present invention has been described. Description for FIG. 4, FIG. 5, and FIG. 6 may be applicable to the present exemplary embodiment. Thus, further detailed description related thereto will be omitted.

The term "mobile terminal" used throughout the present specification may include communication devices, such as an orthogonal frequency division multiplexing (OFDM) and OFDMA communication device; portable terminals such as a personal digital assistant (PDA), a hand-held PC, a notebook computer, a laptop computer, a WiBro terminal, an MP3 player, and an MD player; and all types of hand-held based wireless communication devices. Also, the "mobile terminal" may include a predetermined communication module such as an OFDMA module, a CDMA module, a Bluetooth module, an Infrared Data Association (IrDA) module, a wired/wireless local area network (LAN) card and a wireless communication device having a global positioning system (GPS) chip to enable tracking of a position via GPS. Also, the "mobile terminal" may include a microprocessor that can play multimedia and perform a certain calculation operation.

The preamble acquisition method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD-ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, a method and apparatus for acquiring a preamble according to the present invention may simplify a preamble acquisition process via a pre-processing procedure using a portion of PN codes, and thereby reduce a preamble acquisition time. Here, the PN codes are used for a preamble carrier modulation.

Also, according to the present invention, it is possible to prevent a correlation calculation from being repeated during a pre-processing procedure using a portion of PN codes where some patterns of the PN codes are identical.

Also, according to the present invention, it is possible to efficiently use the entire resources of a terminal by reducing hardware and software resources used for acquiring a preamble.

Also, according to the present invention, it is possible to prevent repeating an unnecessary calculation with respect to a PN code with a low preamble acquisition probability, and to thereby more precisely verify PN codes with a high preamble acquisition probability.

Also, according to the present invention, it is possible to store a portion of or all PN codes in a terminal since the length and a number of PN codes, which are used for acquiring an OFDMA preamble, are limited, and to thereby reduce a preamble acquisition time.

Also, according to the present invention, it is possible to enable threshold values used for a two-step correlation calculation and the length of a correlation range to be adjusted by a user or according to a channel status, and to adaptively control a preamble acquisition performance.

Also, according to the present invention, it is possible to improve performance of a cell searching process that occurs during a hand-off of an OFDMA mobile, and to prevent unnecessary power consumption by the terminal when identifying a base station in the cell searching process.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for acquiring a preamble in an orthogonal frequency division multiple access (OFDMA) mobile terminal, the apparatus comprising:
    a first pseudo-noise (PN) code generation unit to generate a first PN code comprising a bit string including at least one bit;
    a first correlation calculation unit to correlate a preamble signal with the first PN code within a first correlation range to generate a first correlation value;
    a first correlation value comparison unit to compare the first correlation value with a first threshold value and to determine whether to generate a second PN code;
    a second PN code generation unit to generate a second PN code comprising bit values of the first PN code in specific bits of the second PN code according to the determination result;
    a second correlation calculation unit to correlate the preamble signal with the second PN code within a second correlation range to generate a second correlation value; and
    a preamble acquisition determination unit to compare the second correlation value with a second threshold value and to determine whether to acquire the preamble.

2. The apparatus of claim 1, wherein the second PN code generation unit comprises:
    an index table storage unit to store an index value of the second PN code corresponding to the first PN code; and
    a code generator to generate the second PN code based on the index value of the second PN code.

3. The apparatus of claim 1, wherein the second PN code generation unit comprises:
    a code table storage unit to store a stored PN code corresponding to the first PN code; and
    a code generator to generate the second PN code by selecting the stored PN code from the code table storage unit.

4. The apparatus of claim 1, wherein the first PN code generation unit comprises:
    a code table storage unit to store a plurality of PN codes; and
    a code generator to generate the first PN code by selecting a stored PN code from the code table storage unit.

5. The apparatus of claim 1, wherein a bit length of the first correlation range is less than a bit length of the second correlation range.

6. The apparatus of claim 1, wherein a bit length of the first correlation range is four bits.

7. The apparatus of claim 1, wherein a bit length of the second correlation range is no longer than a number of subcarriers transmitting the preamble.

8. The apparatus of claim 1, wherein the first threshold value or the second threshold value is determined based on at least one of a number of subcarriers transmitting the preamble, a bit length of the first correlation range, a bit length of the second correlation range, a number of possible first PN codes, and a number of possible second PN codes.

9. The apparatus of claim 1, further comprising:
a parameter configuration unit to configure a parameter value associated with at least one of the first threshold value, the second threshold value, a bit length of the first correlation range, and a bit length of the second correlation range,
wherein the parameter configuration unit configures the parameter value based on an input from a user or a property of a wireless channel transmitting the preamble signal.

10. An orthogonal frequency division multiple access (OFDMA) mobile terminal apparatus, comprising:
a frequency domain transform unit to transform a time domain preamble signal into a frequency domain preamble signal;
a preamble acquisition unit to acquire a preamble by correlating the frequency domain preamble signal with a PN code; and
a cell search unit to extract base station information of a cell where the terminal apparatus is located from the acquired preamble,
wherein the preamble acquisition unit correlates the frequency domain preamble signal with a first PN code within a first correlation range to generate a first correlation value, determines whether to generate a second PN code comprising bit values of the first PN code according to the first correlation value, and correlates the frequency domain preamble signal with the second PN code within a second correlation range to determine whether to acquire the preamble.

11. A method for acquiring a preamble in an orthogonal frequency division multiple access (OFDMA) mobile terminal, comprising:
correlating a preamble signal with a first PN code within a first correlation range to generate a first correlation value;
comparing the first correlation value with a first threshold value, and determining whether to generate a second PN code according to the comparison result;
generating a second PN code comprising bit values of the first PN code in specific bits of the second PN code according to the determination result;
correlating the preamble signal with the second PN code within a second correlation range to generate a second correlation value; and
comparing the second correlation value with a second threshold value, and acquiring the second PN code as the preamble according to the comparison result.

12. The method of claim 11, wherein generating the second PN code further comprises:
generating the second PN code if the first correlation value is greater than the first threshold value; and
correlating the preamble signal with a new first PN code within the first correlation range to generate a new first correlation value if the first correlation value is less than the first threshold value.

13. The method of claim 11, wherein the acquiring the second PN code as the preamble further comprises:
generating a new second PN code comprising bit values of the first PN code and correlating the preamble signal with the new second PN code within the second correlation range to generate a new second correlation value if the second correlation value is less than the second threshold value; and
acquiring the second PN code as the preamble if the second correlation value is greater than the second threshold value.

14. The method of claim 11, wherein a bit length of the first correlation range is less than a bit length of the second correlation range.

15. The method of claim 11, wherein a bit length of the first correlation range is four bits.

16. The method of claim 11, wherein a bit length of the second correlation range is no longer than a number of subcarriers transmitting the preamble.

* * * * *